United States Patent [19]

Ballas

[11] Patent Number: 4,571,875
[45] Date of Patent: Feb. 25, 1986

[54] FISH LANDING NET

[76] Inventor: William E. Ballas, 8037 Winona, Allen Park, Mich. 48101

[21] Appl. No.: 709,673

[22] Filed: Mar. 8, 1985

[51] Int. Cl.⁴ .............................................. A01K 77/00
[52] U.S. Cl. ...................................................... 43/11
[58] Field of Search ................................ 43/11, 12, 7

[56] References Cited

U.S. PATENT DOCUMENTS

| | | | |
|---|---|---|---|
| 878,529 | 2/1908 | Holmes | 43/12 |
| 1,007,758 | 11/1911 | White | 43/11 |
| 2,124,952 | 7/1938 | Norris et al. | 43/12 |
| 2,653,404 | 9/1953 | Phaneuf | 43/12 |
| 2,688,815 | 9/1954 | Phillips | 43/12 |
| 2,727,328 | 12/1955 | Dunton | 43/12 |
| 2,738,608 | 3/1956 | Buzzini | 43/12 |
| 2,772,502 | 12/1956 | Norris | 43/11 |
| 2,818,670 | 1/1958 | Darkenwald | 43/11 |
| 3,077,237 | 2/1963 | Nakatama | |
| 3,167,878 | 2/1965 | Daffron | 43/12 |
| 4,031,650 | 6/1977 | Popeil | 43/12 |

Primary Examiner—Gene P. Crosby
Attorney, Agent, or Firm—Cullen, Sloman, Cantor, Grauer, Scott & Rutherford

[57] ABSTRACT

A fish landing net has a tubular handle with a circular coplanar frame at one end. A conical netting has an apex and an open end secured to the frame. A tension spring biased pulley journaled within the handle has a cord wound thereon, at its free end secured to the netting apex holding the netting collapsed against the handle when not in use. The weight of a fish in the net extends the netting and unwinds the cord against spring tension, the netting automatically collapsing on unloading.

7 Claims, 2 Drawing Figures

FISH LANDING NET

The present invention relates to landing nets for fish and particularly such a net which is normally collapsed when not in use and when loaded with a fish, expands against spring tension applied to a cord extending between the handle and the net apex.

BACKGROUND OF THE INVENTION

Heretofore in the use of fish nets, various means have been employed for mounting the net upon the handle so that when not in use, the net is fully collapsed and enclosed upon the interior of the handle. This is primarily for the purpose of preventing the net from becoming connected with a fishing lure or fish hook such as would prevent landing of a fish when needed. In some instances the fish net heretofore has been partly collapsed with respect to the elongated handle therefore, by the use of slidable or retractable mechanisms partly retracting the net or for enclosing it within a housing upon one end of the tubular handle or with respect to a frame.

THE PRIOR ART

Illustrative prior art are shown in one or more of the following U.S. patents:

| NUMBER | NAME | DATE |
| --- | --- | --- |
| 878,529 | A. Holmes | February 11, 1908 |
| 1,124,952 | R. V. Norris et al | July 26, 1938 |
| 2,653,404 | J. R. Phaneuf | September 29, 1953 |
| 2,727,328 | C. E. Dunton | December 20, 1955 |
| 2,738,608 | L. H. Buzzini | March 20, 1956 |
| 2,772,502 | L. H. Norris | December 4, 1956 |
| 2,818,670 | G. A. Darkenwald | January 7, 1958 |
| 3,077,237 | Mitsura Nakatama | February 12, 1963 |
| 3,167,878 | G. M. Daffron | February 2, 1965 |
| 4,031,650 | Samuel Joseph Popeil | June 28, 1977 |

SUMMARY OF THE INVENTION

An important feature of the present invention is to provide an improved and simplified fish landing net wherein upon a tubular handle mounting a coplanar frame at one end, there is suspended a netting of conical form with the apex of the netting connected by a cord to a spring biased pulley normally holding the netting collapsed against the handle of the landing net assembly.

An important feature is to provide an improved fish landing net wherein intermediate the ends of the handle there is provided a pulley housing within which is journaled a spring biased pulley winding an elongated flexible cord held retracted, with the free end of the cord extending through and outwardly of the handle and connected to the net apex whereby when not in use, the net is collapsed to and adjacent the handle.

As another feature when the collapsed net is loaded with a fish, its weight opens up the net and extends the line under the spring bias of the pulley.

Another feature is to provide a ring upon the apex of the netting together with a snap hook upon the free end of the line and connected to the line with the line normally wound upon the pulley collapses and retains the net adjacent the landing net handle until it is used.

Another feature includes a spring biased pulley assembly upon the handle whereby upon unloading the net, the net automatically collapses to and adjacent the handle intermediate its ends.

These and other features and objects will be seen from the following Specification and claims in conjunction with the appended drawings.

THE DRAWING

Figures 1, 2:
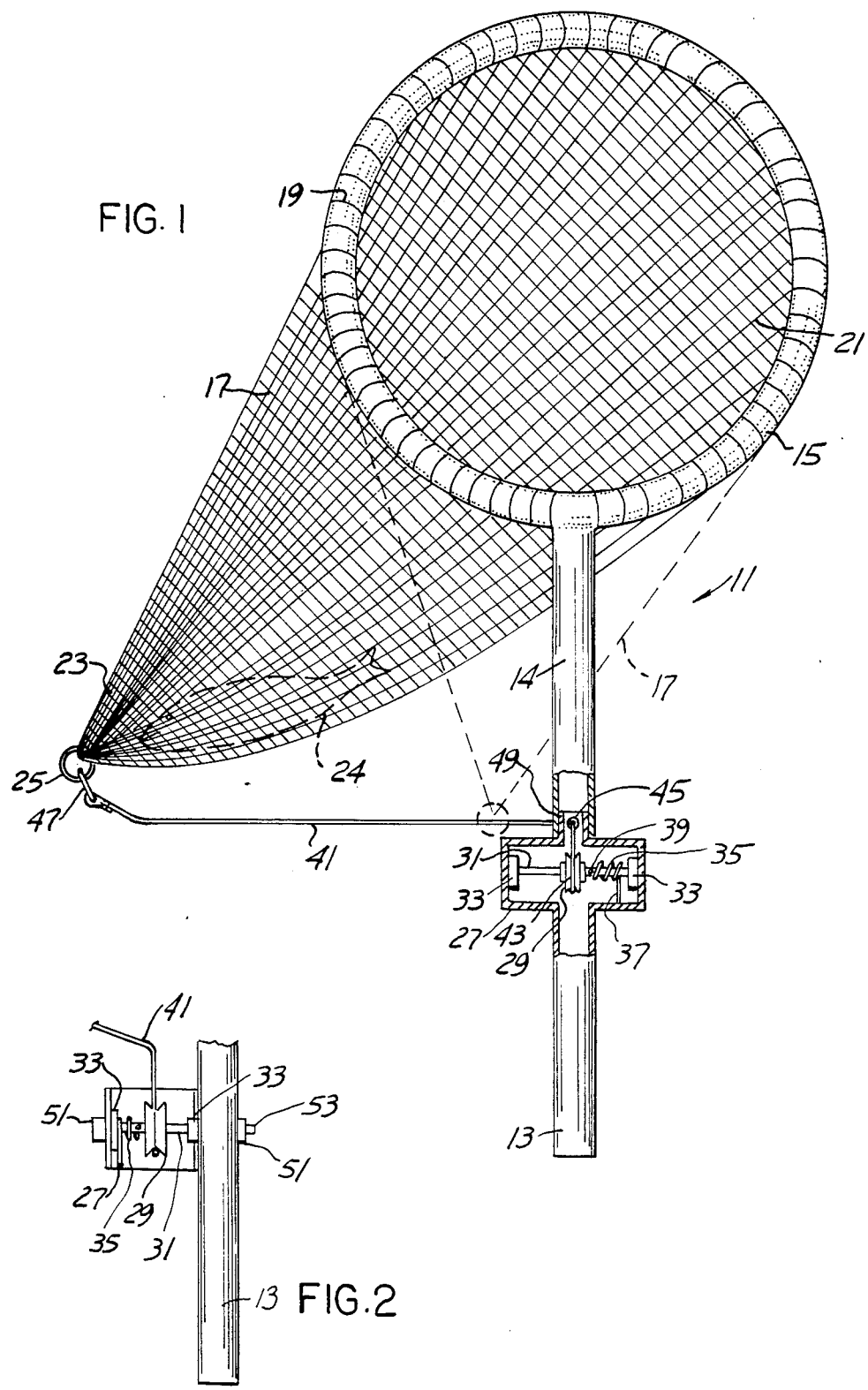
FIG. 1 is a fragmentarily, partly broken away and sectioned front elevational view of the present fish landing net.
FIG. 2 is a fragmentary view of the landing net with the pulley assembly clamped thereon.

It will be understood that the above drawing illustrates merely a preferred embodiment of the invention, and that other embodiments are contemplated within the scope of the claims hereafter set forth.

DETAILED DESCRIPTION OF AN EMBODIMENT OF THE INVENTION

The present fish landing net is generally indicated at 11 in the drawing includes a handle which may be two pieces as including a first part 13 and a second axially connected part 14 mounted upon one end of the first part and coplanar therewith is a circular support frame 15, which in the preferred embodiment is tubular, for illustration.

Netting 17 is of general conical shape and is constructed with a suitable mesh material of cotton or nylon such as is used for fish nets. The netting includes at its open end 21 a channel formation 19 which is positioned over, around or otherwise connected to circular frame 15, from which the netting depends.

The apex or closed end 23 of the netting in the normal loaded position is shown extending at approximately right angles to the axis of the handle 13–14. Upon the apex 23 there is mounted a suitable anchor ring or grommet 25 made of metal, or a plastic material.

Intermediate the ends of handle 13–14 is a pulley housing 27 within which is journaled and supported the tension spring pulley 29. The pulley assembly includes transverse shaft 31 at its ends journaled within bearings 33 upon opposite sides of pulley housing 27. A tension or torsion spring 35 is mounted upon pulley shaft 31, at one end is anchored at the housing at 37 and at its opposite end is secured to said shaft at 39.

The flexible line or cord 41 is anchored to the pulley at 43 and is normally wound there around. The free end of line 41 extends through the guide aperture or bore 45 within handle 13–14 and at its free end has a snap hook 47 or fastener for removable connection with ring 25.

In the drawing, the netting is shown in its normal, extended and loaded position with a fish therein shown in dash lines. In such use position the line 41 is extended outwardly of handle 13–14 as partly unwound from pulley 29 and under spring tension.

When the net is unloaded by removal of the fish, the spring action on pulley 29 automatically rewinds the pulley and the line 41 thereon, collapsing the netting and the apex 23 of the netting into snug registry with portions of the handle 13–14 as shown in dash lines in the drawing.

As one form of construction, while the pulley may merely be journaled transversely within the handle 13–14, in the illustrative embodiment the tubular handle 13–14 is made up of two parts, namely a first part 13 which at one end terminates in the pulley housing 27 which is laterally enlarged. The upper end of the pulley housng has a tubular fitting 49 or sleeve which snugly projects into the free end of the second part 14 of the tubular handle and is suitably secured thereto.

This is merely by way of illustration of one means by which the tubular handle is formed in two parts, with the pulley housing 27 on the handle intermediate its ends.

As an alternative to a two piece handle 13–14, the handle could be of one piece and wherein the pulley housing 27 is formed as a part of the handle intermediate its ends within which the pulley 29 is supported and journaled.

In operation, the line 41 is wound upon and extends from spring tension spring pulley 29 to the ring 25, fastened to the apex of the conical meshing 17 and is connected thereto by snap hook 47, which can be disconnected as desired. When no fish is in the meshing 17 the cord 41 is wound around pulley 29 by the tension spring 35 collapsing the netting against this handle.

When a fish is inserted into meshing 17, the tension spring pulley allows the mesh to drop away from the handle such as to the position shown in the drawing upon an axis at right angles to the handle. Once the fish is removed from the meshing, the tension spring pulley 29 automatically winds the line 41 onto the pulley thereby pulling the mesh to and adjacent the handle to the dash line position shown at 17 in the drawing.

The purpose of the present invention is to keep the mesh as flat and as close to the tubing as possible so as not to tangle with objects or baits or hooks when not in use.

A modified fish landing net is fragmentarily shown in FIG. 2 corresponding to the structure disclosed in FIG. 1, but wherein the pulley housing 27 and the complete pulley assembly and its mounting are secured to the outside of an existing landing net and retained thereon by a strap or clamp 51 with suitable fastener 53. This provides a means by which existing fish landing nets may have attached thereto the present spring biased pulley assembly for collapsing the net when not in use.

The construction of the pulley assembly is exactly the same as disclosed in FIG. 1.

Having described my invention, reference should now be had to the following claims

I claim:

1. A fish landing net comprising of elongated tubular handle;
   a circular net support frame on one side secured to one end of said handle and coplanar therewith;
   a netting of conical form having an apex and a circular open end receiving and mounted over said frame and secured thereto;
   a ring secured to said apex;
   a tension spring biased pulley journaled and supported within said handle intermediate its ends;
   and a flexible cord wound around and at one end secured to said pulley, extending through an aperture in said handle and at its free end secured to said ring;
   said cord being normally wound upon said pulley with the netting apex closely adjacent said handle collapsing said netting when not in use, projecting of a fish into said netting, expanding said netting to a position substantially at right angles to said handle and unwinding said cord against said spring tension;
   said cord automatically rewinding, collapsing said netting when the fish is removed therefrom.

2. In the fish landing net of claim 1, the securing of said netting to said frame including a sleeve at the open end of said netting receiving said frame.

3. In the fish landing net of claim 1, the securing of said cord to said ring including a snap hook on the free end of said cord removably connected to said ring.

4. In the fish landing net of claim 1, a pulley housing mounted upon said handle intermediate its ends;
   a pulley shaft transverse of said handle journaled and supported at its ends within said pulley housing;
   said pulley being mounted and secured upon said shaft;
   and a coiled spirng upon said shaft at one end anchored to said housing and at its other end connected to said shaft;
   said cord being normally wound upon said pulley.

5. In the fish landing net of claim 4, said handle being sectional having a tubular first part mounting said pulley housing;
   said housing terminating in a sleeve;
   and a tubular second part extending from said frame having an open end snugly receiving said sleeve and secured thereto.

6. A fish landing net comprising of elongated tubular handle;
   a circular net support frame on one side secured to one end of said handle and coplanar therewith;
   a netting of conical form having an apex and a circular open and receiving and mounted over said frame and secured thereto;
   a ring secured to said apex;
   a pulley housing mounted upon the outside of said handle intermediate its ends;
   a tension spring biased pulley journaled and supported within said housing;
   and a flexible cord wound around and at one end secured to said pulley, extending from said housing and at its free end to said ring;
   said cord being normally wound upon said pulley with the netting apex closely adjacent said handle collapsing said netting when not in use;
   projecting a fish into said netting expanding said netting to a position substantially at right angles to said handle and unwinding said cord against its spring tension;
   said cord automatically rewinding collapsing said netting when the fish is removed therefrom.

7. In the landing net of claim 6, a clamp strap extending around said pulley housing and secured to said handle.

* * * * *